United States Patent Office 3,081,348
Patented Mar. 12, 1963

3,081,348
CATALYSTS FOR CONDENSATION REACTIONS OF PRIMARY AMINES WITH DIHYDROXY AROMATIC COMPOUNDS
Ronald B. Spacht, Kent, Ohio, assignor to The Goodyear Tire & Rubber Company, Akron, Ohio, a corporation of Ohio
No Drawing. Filed July 25, 1958, Ser. No. 750,858
6 Claims. (Cl. 260—576)

This invention is concerned with condensation catalysts and a process for preparing various diamines. In particular, this invention is concerned with the use of amine hydrohalides plus iron compounds as catalysts in a process for condensing primary amines and hydroquinones.

It is an object of this invention to provide a catalyst system for condensing primary amines and polyhydroxy aromatic compounds. It is a further object of this invention to provide a process for condensing primary amines and polyhydroxy compounds which is characterized by the use of catalysts comprised of amine hydrohalides plus iron and/or iron salts.

In the practice of this invention, aromatic diamines are prepared by condensing an amine with a polyhydroxy aromatic compound in the presence of a catalyst comprised of an amine hydrohalide and an iron composition. The amine hydrohalides which are used in combination with iron compositions as catalysts for the reaction of primary amines with hydroquinones may be further described by the following structural formula

wherein $R^2$ is hydrogen or a primary or secondary alkyl radical having from 1 to 20 carbon atoms, aralkyl radicals having from 7 to 12 carbon atoms, cycloalkyl radicals having from 5 to 8 carbon atoms, aryl radicals conforming to the following structure

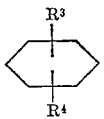

wherein $R^3$ and $R^4$ are hydrogen or the same or different primary or secondary alkyl radicals having from 1 to 20 carbon atoms, aralkyl radicals having from 7 to 12 carbon atoms, cycloalkyl radicals having from 5 to 8 carbon atoms or alkoxy radicals having from 1 to 9 carbon atoms, and wherein X is a halogen. Although the amine hydrobromides and the amine hydroiodides are useful in practicing the invention, the amine hydrochlorides are preferred. The amine hydrohalide catalysts of this invention include ammonium halides which catalyze the condensation reactions between primary amines and hydroquinones as effectively as other amine hydrohalides when used in combination with an iron composition.

Amine hydrohalides which are useful in the practice of this invention are:

Ammonium chloride
Ammonium bromide
Ammonium iodide
Butylamine hydrochloride
Methylamine hydrochloride
Methylamine hydrobromide
Aniline hydrochloride
Aniline hydrobromide
O-toluidine hydrochloride
O-toluidine hydrobromide
P-anisidine hydrochloride
O-anisidine hydrobromide
Amylaniline hydrochloride
Amylaniline hydrobromide
Cyclohexylamine hydrochloride
Cyclohexylamine hydrobromide
Benzylamine hydrochloride
Benzylamine hydrobromide
2,4-xylidine hydrochloride The iron composition may be metallic iron in the form of powders or filings, iron oxides such as FeO, $Fe_2O_3$ and $Fe_3O_4$, and the iron hydroxides. After the reaction is completed, the iron may be removed by precipitating the same in the form of an insoluble iron salt.

More particularly, the invention is concerned with the process of preparing aromatic diamines comprising (1) preparing a mixture of at least one primary amine and at least one polyhydroxy aromatic compound, (2) adding to said mixture a catalytic amount of a catalyst comprised of an amine hydrohalide and an iron composition, (3) reacting said mixture while continuously removing the formed water in the form of an azeotrope, and (4) cooling and purifying the formed aromatic diamines.

The diamines which can be prepared by the practice of this invention may be described as diamines conforming to the following structural formula

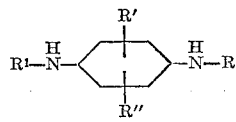

wherein R and $R^1$ may be the same or different primary or secondary alkyl radicals having from 1 to 20 carbon atoms, aralkyl radicals having from 7 to 12 carbon atoms, cycloalkyl radicals having from 5 to 8 carbon atoms, aryl radicals conforming to the following structure

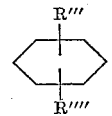

wherein $R'''$ and $R''''$ are hydrogen or the same or different primary or secondary alkyl radicals having from 1 to 20 carbon atoms, aralkyl radicals having from 7 to 12 carbon atoms, cycloalkyl radicals having from 5 to 8 carbon atoms or alkoxy radicals having from 1 to 9 carbon atoms, wherein $R'$ and $R''$ may be hydrogen or primary or secondary alkyl radicals containing from 1 to 20 carbon atoms.

In preparing the diamines of this invention which are useful as antioxidants for rubber, the primary amines which may be condensed with the polyhydroxy aromatic compounds may be described as one or a mixture of aliphatic or aromatic primary amines which may be defined by the following structural formula

R—NH$_2$ wherein R may be a primary or secondary alkyl radical containing from 1 to 20 carbon atoms, an aralkyl radical having from 7 to 12 carbon atoms, a cycloalkyl radical having from 5 to 8 carbon atoms, or an aryl radical conforming to the following structure

where $R'''$ and $R''''$ are hydrogen or the same or different primary or secondary alkyl radicals having from 1 to 20 carbon atoms, aralkyl radicals having from 7 to 12 carbon atoms, cycloalkyl radicals having from 5 to 8 carbon atoms or alkoxy radicals having from 1 to 9 carbon atoms.

The amines which conform to the above and which are useful in the practice of this invention are well known in the art. Illustrative of the aliphatic amines are the primary and secondary butyl, octyl, and nonyl amines, etc. Illustrative of the cycloaliphatic amines are cyclohexylamine, methyl cyclohexylamine, etc. Illustrative of the aromatic amines are aniline, o-toluidine, 2,4-xylidine, o-anisidine, p-anisidine, etc.

The polyhydroxy aromatic compounds are preferably hydroquinones such as hydroquinone or substituted hydroquinones wherein the substitution is an alkyl radical containing from 1 to 20 carbon atoms. Corresponding resorcinols and catechols are non-fully equivalent polyhydroxy aromatic compounds which can be used in the practice of this invention.

It has been discovered that amine hydrohalides including ammonium halides, and iron compositions including metallic iron are particularly effective catalysts for the condensation of primary amines and polyhydroxy aromatic compounds. The amine hydrohalides and iron compositions may be used in customary catalytic amounts. For example, from 0.05 mol to 0.2 mol of amine hydrohalide, or ammonium halide and from 0.01 to 0.05 mol of iron compositions may be used per mol of hydroquinone. Preferred ratios are 0.08 to 0.12 mol of amine hydrohalide to 0.02–0.04 mol of iron composition per mol of hydroquinone. The components of the catalyst system may be added individually to the mixture of primary amines and hydroquinone or may be mixed before being added to the mixture of hydroquinone and primary amines.

Although not absolutely necessary in the practice of the invention, it is preferable to add a compound capable of forming an azeotrope with water to the reaction mixture. This compound may also be used as a carrier for the catalyst, if desired, although this is not necessary in practicing the invention. These compounds may be known liquid hydrocarbons which are capable of forming an azeotrope with water which is formed in the condensation reaction. For example, toluene, benzene, xylene, etc., may be used for this purpose.

Customary reaction conditions may be used in condensing the primary amines with the polyhydroxy aromatic compounds and will, of course, depend on the reactants being used in preparing the aromatic diamines. The process is customarily practiced in a pressure system which normally ranges from 100 and 150 p.s.i. although it may be practiced at pressures ranging from atmospheric pressure to 20 atmospheres of pressure. The temperature of the reaction will customarily be between 250° C. and 275° C. although temperatures between 220° C. and 320° C. may be used and temperatures between 100° C. and 350° C. are effective in the practice of the invention. The time required for completion of the condensation will, of course, depend upon the temperature, pressure and reactants. Normally, the reaction is completed in a period of 4 to 6 hours although the time may range from a few minutes to as much as 20 hours.

The concentration of primary amines in the condensation reaction will customarily range from about 2 to 3 mols of amine per mol of polyhydroxy compound. Since a slight excess of amine over the theoretical proportions of the preferred dihydroxy compounds is desired, about 2.25 mols of amine per mol of polyhydroxy compounds is customarily used. The amines and polyhydroxy compounds may be pure compounds or may be mixtures of the respective amines and polyhydroxy compounds.

The invention is further characterized by the following examples which are not intended as limitations on the scope of the invention. The following laboratory experiments were made at atmospheric pressure in a batching vessel designed for the continuous removal of the water of condensation. This was accomplished using an air condenser which was connected to a downward water-cooled condenser. The temperature of the reaction was controlled so that very little amine distilled from the reaction vessel. The water of condensation was collected in a graduate containing 100 millimeters of toluene. The reaction was followed by the amount of water collected in the graduate. Thereafter, the reaction mixture was cooled to about 150° C. and the diamines were purified.

EXAMPLE 1

Two hundred and twenty grams of hydroquinone, 125 grams of aniline, 24 grams of aniline hydrochloride and 6 grams of iron oxide were added to a flask. The reaction vessel was heated to a temperature of about 180° C. and the temperature was gradually raised to about 240° C. Then 325 grams of additional aniline were added slowly at this temperature until no more water of condensation came out of the reaction vessel. After digestion for ½ hour, the volatiles were removed by heating the reacted mixtures to 260° C. at 8 millimeters of pressure. Tests indicated that the diamine yield was 481 grams of product having a melting point of 132–138° C. which would be about 92 percent of the theoretical yield.

EXAMPLE 2

The process of Example 1 was repeated except that the catalyst was comprised of 24 grams of aniline hydrochloride and 4 grams of $Fe_2O_3$.

EXAMPLE 3

The process of Example 1 was repeated except that the catalyst was comprised of 32 grams of aniline hydrobromide and 6 grams of $Fe_2O_3$.

EXAMPLE 4

The process of Example 1 was repeated except that the catalyst was comprised of 10 grams of ammonium chloride and 6 grams of $Fe_2O_3$.

EXAMPLE 5

The process of Example 1 was repeated except that the catalyst was comprised of 18 grams of ammonium bromide and 6 grams of $Fe_2O_3$.

EXAMPLE 6

The process of Example 1 was repeated except that the catalyst was comprised of 24 grams of aniline hydrochloride and 4 grams of iron powder.

Using hydroquinone as one reactant, similar experiments have been made wherein the amines used in the reaction were mono and di amyl aniline and mono and di dodecyl aniline. Also, similar experiments have been made using ortho toluidine and para anisidine as the amine reactant. In addition, similar experiments have been made wherein mixtures of amines have been used. For example, various mixtures of aniline and o-toluidine and various mixtures of aniline and cyclohexylamine have been used.

As indicated, the presence of iron in an antioxidant is very undesirable. It has further been discovered that the undesirable iron may be removed by adding a water-soluble salt, which is capable of providing an insoluble iron salt, to the reaction mixture after the condensation is complete but before the diamines have been purified. The various alkali metal salts which are soluble in water may be used for this purpose. For example, the carbonates, hydroxides, phosphates, sulfides, sulfites, etc., of monovalent metals such as sodium, potassium, lithium, etc., may be used for this purpose. Also, the corresponding ammonium salts may also be used. Ammonia is treated herein as an alkali metal. The preferred compounds are sodium carbonate and sodium phosphate because they readily react with the iron to form insoluble iron compounds which are easily removed from the reaction mixture during the purification process.

Each of the above experiments produced the corresponding diamines in almost theoretical yield in reasonably short periods of time.

The superiority of mixtures of amine hydrohalides and iron compositions is shown in Table I wherein the experiments were conducted as described in Example 1.

*Table 1*

COMBINATIONS OF CATALYSTS

| Catalysts | Quantity per Mole of Hydroquinone in Grams | 50% H₂O | | 100% H₂O | | Yield, Gms. | Yield | Melting Point, °C. |
|---|---|---|---|---|---|---|---|---|
| | | Time (Mins.) | Temp., °C. | Time (hrs.) | Temp., °C. | | | |
| Aniline hydrochloride | 12 | 75 | 245 | 6.5 | 255 | 446 | 86 | 130–140 |
| Aniline hydrochloride | 12 | 35 | 243 | 3.0 | 257 | 489 | 94 | 135–140 |
| Fe₂O₃ | 2 | | | | | | | |
| Aniline hydrochloride | 12 | 50 | 240 | 7 | 255 | 471 | 90.5 | 137–144 |
| Fe | 2 | | | | | | | |
| Aniline hydrobromide | 16 | 50 | 253 | 6 | 250 | 423 | 81.5 | 133–139 |
| Aniline hydrobromide | 16 | 25 | 225 | 3 | 250 | 491 | 94.0 | 136–141 |
| Fe₂O₃ | 3 | | | | | | | |
| NH₄Cl | 5 | 50 | 243 | 5 | 255 | 424 | 82.0 | 131–140 |
| NH₄Cl | 5 | 40 | 240 | 3 | 250 | 468 | 90.0 | 134–142 |
| Fe₂O₃ | 3 | | | | | | | |
| NH₄Br | 9 | 30 | 220 | 3.5 | 258 | 470 | 90.0 | 135–140 |
| Fe₂O₃ | 3 | | | | | | | |
| Fe | | No reaction | | | | | | |

Thus, the mixtures of amine hydrohalides and iron compositions used in the process described herein are unexpectedly superior catalysts for reacting primary amines with hydroquinones because (1) lower reaction temperatures may be used, (2) reactions are faster, (3) less tarry by-products result, (4) less diphenylamine is produced and (5) a substantial increase in diamine content is possible. The catalysts described herein coupled with the removal of iron from the formed diamines, provides unexpectedly superior antioxidants for oxidizable materials such as rubber.

While certain representative embodiments and details have been shown for the purpose of illustrating the invention, it will be apparent to those skilled in this art that various changes and modifications may be made therein without departing from the spirit or scope of the invention.

I claim:

1. In the process of preparing aromatic diamines comprising reacting (1) from two to three mols of a primary amine having the following structural formula

R—NH₂ wherein R is selected from the group consisting of primary alkyl radicals containing from 1 to 20 carbon atoms, secondary alkyl radicals containing from 1 to 20 carbon atoms, cycloalkyl radicals containing from 5 to 8 carbon atoms, and aryl radicals conforming to the following structure

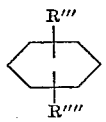

wherein R''' and R'''' are selected from the group consisting of hydrogen, primary alkyl radicals containing from 1 to 20 carbon atoms, and alkoxy radicals containing from 1 to 9 carbon atoms with (2) one mole of a dihydroxy aromatic compound selected from the group consisting of hydroquinone, resorcinol and catechol at a temperature between 100 and 350° C., the improvement wherein the reaction is conducted in the presence of a liquid hydrocarbon capable of forming an azeotrope with water selected from the group consisting of toluene, benzene, and xylene and in the presence of a mixture composed of from 0.05 to 0.2 mol of a compound selected from the group consisting of ammonium chloride, ammonium bromide, ammonium iodide, amine hydrochlorides, amine hydrobromides and amine hydroiodies and from 0.01 to 0.05 mol of an iron composition selected from the group consisting of metallic iron, iron oxide, and iron hydroxide per mol of dihydroxy aromatic compound used in the reaction.

2. A process according to claim 1 wherein the liquid hydrocarbon capable of forming an azeotrope with water is toluene.

3. In the process of preparing aromatic diamines comprising reacting (1) from two to three mols of a primary amine having the following structural formula

R—NH₂ wherein R is selected from the group consisting of primary alkyl radicals containing from 1 to 20 carbon atoms, secondary alkyl radicals containing from 1 to 20 carbon atoms, cycloalkyl radicals containing from 5 to 8 carbon atoms, and aryl radicals conforming to the following structure

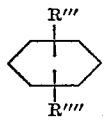

wherein R''' and R'''' are selected from the group consisting of hydrogen, primary alkyl radicals containing from 1 to 20 carbon atoms, and alkoxy radicals containing from 1 to 9 carbons atoms with (2) one mole of a dihydroxy aromatic compound selected from the group consisting of hydroquinone, resorcinol and catechol at a temperature between 100 and 350° C., the improvement wherein the reaction is conducted in the presence of a mixture composed of from 0.05 to 0.2 mol of a compound selected from the group consisting of ammonium chloride, ammonium bromide, ammonium iodide, amine hydrochlorides, amine hydrobromides and amine hydroiodides and from 0.01 to 0.05 mol of an iron composition selected from the group consisting of metallic iron, iron oxide, and iron hydroxide per mol of dihydroxy aromatic compound used in the reaction.

4. A process according to claim 3 wherein the catalytic composition is composed of aniline hydrochloride and ferric oxide.

5. A process according to claim 3 wherein the iron composition is metallic iron.

6. A process according to claim 3 wherein the iron composition is iron oxide.

References Cited in the file of this patent

UNITED STATES PATENTS 2,029,642 Semon _____ Feb. 4, 1936
2,133,825 Meuser et al. _____ Oct. 18, 1938

(Other references on following page)

UNITED STATES PATENTS

| | | |
|---|---|---|
| 2,156,792 | Neal et al. | May 2, 1939 |
| 2,166,223 | Semon | July 18, 1939 |
| 2,180,936 | Dunbrook | Nov. 21, 1939 |
| 2,225,368 | Craig | Dec. 17, 1940 |
| 2,238,320 | Hardman | Apr. 15, 1941 |
| 2,503,712 | Clemens et al. | Apr. 11, 1950 |
| 2,824,137 | Morris | Feb. 18, 1958 |

FOREIGN PATENTS

| | | |
|---|---|---|
| 611,316 | Great Britain | Oct. 28, 1948 |
| 619,877 | Great Britain | Mar. 16, 1949 |
| 314,872 | Great Britain | 1931 |